W. W. WALLACE.
TOOTH-PICK.

No. 175,794             Patented April 4, 1876.

Witnesses:
Lewis F. Brous?
A. P. Grant.

Inventor:
Wm. W. Wallace
by John A. Wiedersheim
Attorney.

UNITED STATES PATENT OFFICE.

WILLIAM W. WALLACE, OF PHILADELPHIA, PENNSYLVANIA.

IMPROVEMENT IN TOOTH-PICKS.

Specification forming part of Letters Patent No. 175,794, dated April 4, 1876; application filed March 16, 1876.

*To all whom it may concern:*

Be it known that I, WILLIAM W. WALLACE, of the city and county of Philadelphia and State of Pennsylvania, have invented a new and useful Improvement in Tooth-Picks or Tooth-Cleansers; and I do hereby declare the following to be a clear and exact description of the nature thereof, sufficient to enable others skilled in the art to which my invention appertains to fully understand, make, and use the same, reference being had to the accompanying drawings, making a part of this specification, in which—

Figure 1:
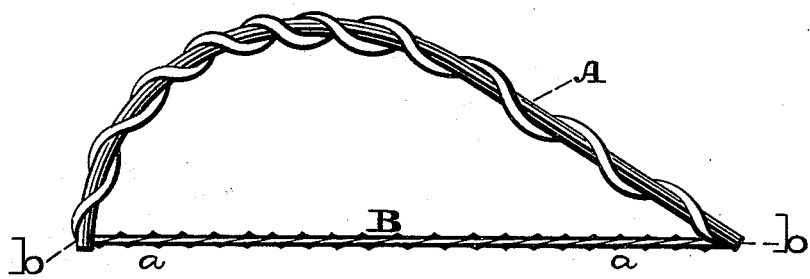
Figure 2:
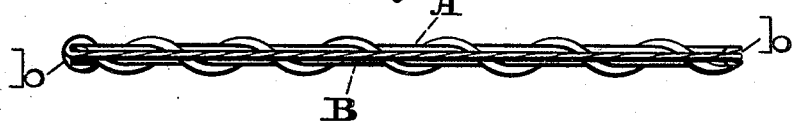
Figure 3:
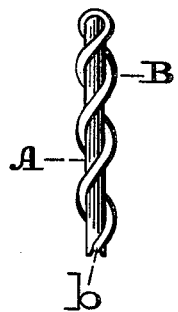

Figure 1 is a side view of the device embodying my invention. Fig. 2 is a bottom view thereof. Fig. 3 is an end view thereof.

Similar letters of reference indicate corresponding parts in the several figures.

My invention consists of a tooth-pick or tooth-cleanser, in which an endless elastic cord is stretched on a bow, and adapted to be inserted in the intervening interstices of the teeth, so that, by reciprocating the bow, the cord will work in said interstices and remove collections therein. It also consists in forming the bow with notched ends, so that an endless cord may be connected thereto without other means of fastening.

Referring to the drawings, A represents a bow, and B a cord stretched across the same, from end to end, as at $a$, and secured thereto.

In operation, the cord will be introduced into the interstices of the teeth, and the bow reciprocated, so that the cord will be worked to and fro in said interstices, whereby all collections therein will be removed and the sides of teeth nicely cleansed.

The cord will be made of soft rubber, so as to avoid laceration of the gums and injury to the enamel of the teeth. In order to secure the cord properly to the bow, the cord will be endless, and each end of the bow is formed with a notch, $b$. The cord is run or wound around the bow, and the portions contiguous to the ends thereof are fitted in the notches $b$, care being taken to wind sufficient of the cord on the bow, so that the length $a$, stretched from end to end, will be properly taut.

It will be seen that the cord will be connected to the bow in a simple and secure manner without fastenings other than the notches $b$, whereby projecting parts, clamps, &c., are avoided.

It will also be seen that a twist is imparted to the length $a$, the shoulders thus formed serving to take hold of the collections between the teeth, and effectually remove the same.

It will be further seen that when the cord wears it may be readily moved and wound on the bow, so that a new working length will be presented.

Having thus described my invention, what I claim as new, and desire to secure by Letters Patent, is—

1. The bow A, in combination with an endless elastic cord, B, stretched from the ends thereof, substantially as and for the purpose set forth.

2. The bow A with notches $b$, and the endless cord B connected thereto, substantially as and for the purpose set forth.

WM. W. WALLACE.

Witnesses:
JOHN A. WEIDERSHEIM,
JNO. A. BELL.